United States Patent [19]

Womack

[11] Patent Number: 4,561,811
[45] Date of Patent: Dec. 31, 1985

[54] QUICK CHANGE LATCHING OF COMPONENTS

[75] Inventor: Robert C. Womack, Dallas, Tex.

[73] Assignee: AAA Products International, Dallas, Tex.

[21] Appl. No.: 650,091

[22] Filed: Sep. 13, 1984

[51] Int. Cl.[4] .............................................. B23B 35/00
[52] U.S. Cl. .................................. 408/1 R; 10/141 H;
29/526 R; 279/1 B; 279/79; 279/94; 403/229; 408/239 R
[58] Field of Search ...................... 279/1 B, 77, 79, 94;
408/239, 240, 137, 1; 403/229; 10/141 H; 29/526 R

[56] References Cited

U.S. PATENT DOCUMENTS

| | | | |
|---|---|---|---|
| 3,138,984 | 6/1964 | Penner | 279/79 X |
| 3,759,336 | 9/1973 | Marcovitz et al. | 279/1 B X |
| 3,994,518 | 11/1976 | Pollock | 403/229 X |
| 4,032,163 | 6/1977 | Holt | 279/1 B X |
| 4,281,719 | 8/1981 | Hake et al. | 29/526 R X |
| 4,491,443 | 1/1985 | DeCaro | 408/239 A |

Primary Examiner—Frank T. Yost
Attorney, Agent, or Firm—Peter J. Murphy

[57] ABSTRACT

A lever is mounted about an oscillation axis for limited oscillation relative to a first component. A linear tension spring latching member is mounted for rotation on that lever about an axis eccentric to the oscillation axis, the latching member being mounted for frictionally retarded rotation. In the joined condition of second and first components, a latching pin projects from the second component in parallel spaced relation to the oscillation axis and the latching member axis. The tension spring latching member includes a latching hook at its distal end for engagement with the latching pin so that in the latched condition in the components, the spring latching member is tensioned between the latching pin and the eccentric axis. The lever is moved against a limit stop in the latched condition; and in that latched condition the eccentric axis is moved past a plane defined by the oscillation axis and the latching pin, an over center position, so that the latching member tension maintains the lever in that latch condition which becomes a locked condition. The lever is mounted for frictionally retarded rotation on the first component. Simple swinging or oscillation of the lever from the locked position effect linear release of the latching member hook from the latching pin and then swinging movement of the latching member away from the latching pin to a limit stop, and then further linear movement of the spring in the same direction to displace the hook further from the latching pin position.

14 Claims, 9 Drawing Figures

QUICK CHANGE LATCHING OF COMPONENTS

BACKGROUND AND SUMMARY OF THE INVENTION

This invention relates to the latching or securing of one component of subassembly to another, where the one component is frequently changed or interchanged in use; and more particularly to a mechanism and method wherein such latching or securing may be accomplished very quickly and effectively.

This invention may have application in a wide variety of apparatus or mechanisms. One example of apparatus for which the latching mechanism of the invention is well suited, is a hydraulic motor driven lead screw tapping unit of the type described in applicant's U.S. Pat. No. 4,050,835 granted Sept. 27, 1977. The tapping unit which is the subject of that patent is a production tapping unit having a main housing which is secured to a fixture and which, by means of a lead screw, drives a tap into and out of a prebored hole in a workpiece also secured to the fixture. In such tapping unit, the spindle subassembly includes a lead screw, a lead nut which is secured in a lead nut plate which must be secured to one end of the unit housing, a lead screw spindle tap chuck at the distal end of the spindle for mounting the tap. It is frequently necessary to change this spindle subassembly to accommmodate taps having different threads and where, of course, the lead of the lead nut and lead screw must be changed.

Also, in this type of unit, it may be necessary to frequently change the hydraulic drive motor for the unit. For one use of the unit, a high speed-low torque motor may be required; and for another use of the unit, a low speed-high torque motor may be required. Normally, such spindle subassemblies and motor subassemblies are secured to the main housing by means of several bolts; and the changing out of these subassemblies requires substantial time. This type of mounting may be necessary where there is a relative axial load between the subassembly and the main housing; however where there is substantially no axial load, or where there is no substantial axial load tending to separate the subassemblies from the main housing, a lower strength latching system may be employed.

An object of this invention is to provide an improved latching mechanism wherein a component may be released from a main body, and reassembled with a main body in a very short time.

Another object of this invention is to provide such a latching mechanism wherein a latching member is associated with a lever which by simple oscillation effects the release of the latching member and the reengagement of the latching member.

A further object of this invention is to provide a quick change latching mechanism which includes a linear tension spring latching member.

Still another object of this invention is to provide such an improved latching mechanism which is effective and reliable.

Another object of this invention is to provide an improved and unique method for latching one component to another.

A further object of this invention is to provide an improved and unique method for very quickly latching two components together and for unlatching those components.

A still further object of this invention is to provide a novel method for latching and unlatching a pair of components which involves the simple movement of an oscillating lever.

Still another object of this invention is to provide a quick change latching mechanism which includes a stiff by elastic latching arm.

These objects are accomplished in a mechanism which includes a lever rotatably mounted on the first component for oscillation about an axis and a latching pin mounted on the second component. In the joined condition of the first and second components, the latching pin is disposed generally parallel with the axis of the oscillating lever and generally traversing the plane of oscillation of the lever. The lever includes a pivot mount for a latching member, which pivot mount is disposed eccentrically of the lever axis and includes a pivot axis which is parallel to the lever axis. The latching member is a linear tension spring having a pivot mount at one end, and having a hook at its other end configured to engage the latching pin. The latching member is frictionally mounted on the pivot mount of the lever, so that the latching member will normally oscillate with the lever. A stop means is mounted on the first component for limiting the oscillation of the lever in one direction; and this limit position of the lever defines the lock position for the lever wherein the tension of the spring latching member maintains the lever against the stop means. A stop means on the first component limits oscillation of the latching member away from the latch pin, when the lever is moved away from its locked position.

These objects are also accomplished in a method for latching a second component to a first component which includes the following steps. A lever is mounted on the first component for oscillation about an axis. One end of a linear tension spring latch member is mounted on that lever for frictional oscillation about an axis which is eccentric to and parallel to the lever axis. A latch pin is provided on the second component and is disposed, when the second component is in the joined condition with the first component, generally parallel with the lever axis and generally traversing the plain of oscillation of the lever.

The latch member is provided with a latch hook at its distal end for engagement with the latch pin. Oscillation of the lever is limited in one direction relative to the first component to define the latch position of the lever, wherein the lever is maintained in that limit position by the tension of the latch member. The oscillation of the latch member away from the latch pin is limited, during oscillation of the lever away from the lock position, to maintain the latch member in position to reengage the latch pin of a second component which is placed in the joined relation with the first component.

The novel features and the advantages of the invention, as well as additional objects thereof, will be understood more fully from the following description when read in connection with the accompanying drawings.

DRAWINGS

DESCRIPTION OF THE PREFERRED EMBODIMENT

Figure 1:
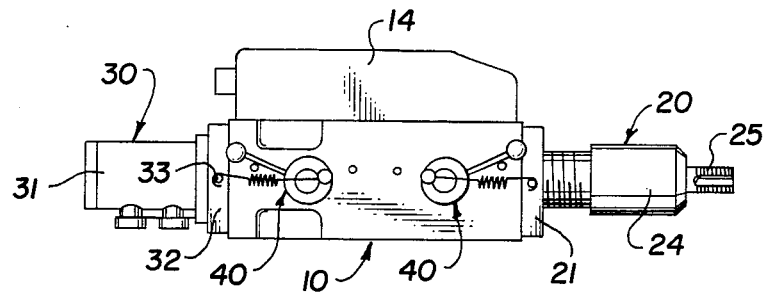
FIG. 1 is a side elevation of a lead screw tapping unit embodying the invention.

As an example of the use of the invention, FIG. 1 of the drawing illustrates a hydraulic motor operated lead screw tapping unit of the type described in applicant's U.S. Pat. No. 4,050,835. This unit includes a main housing 10 which is configured to be mounted on a suitable fixture, a removable spindle subassembly 20 secured to one end of the main housing, and a removable motor subassembly 30 secured to the other end of the main housing. The spindle subassembly and the motor subassembly are secured to the main housing by latching mechanisms 40 according to the present invention. A removable cover 14, attached to the main housing 10, encloses certain adjustable controls which may be set to control the depth of feed of the spindle.

The spindle subassembly 20 includes a lead nut plate 21 which supports a lead nut 22 (shown only in FIG. 9), a spindle 23 which incorporates a lead screw, and a tap chuck 24 mounted at the distal end of the spindle receiving a tap 25. The spindle lead screw is threadedly associated with a lead nut 22 which is nonrotatably fixed in a suitable manner within the lead nut housing 21. The spindle, of course, extends into the main housing 10 and preferably includes a spline portion at its inner end for coupling with the drive of the motor subassembly 30. The lead nut plate 21 is joined to the main housing by means of latching mechanisms according to the invention.

The motor subassembly 30 includes a hydraulic motor 31 mounted on a motor adaptor plate 32 which is, in turn, secured to the main housing 10 by a latching mechanism according to the invention. The drive shaft of the hydraulic motor 31 includes coupling means within the main housing (not shown) for coupling to the splined portion of the spindle 23, and which allows relative axial movement of the spindle while retaining the rotational drive coupling.

A pair of latching mechanism 40 are mounted on one side of the main body 10 for securing, respectively, the spindle subassembly 20 and the motor subassembly 30 to the main housing. The opposite side of the main body is substantially the same in configuration, and also mounts two latching mechanisms 40 for supporting the respective spindle and motor subassemblies. The two latching mechanisms for securing the spindle sub assembly to the main housing, include diametrically opposed latching pins 26, best seen in FIGS. 5 and 9, which project outwardly from the sides of the lead nut plate 21. Corresponding latching pins 33 project outwardly from the sides of the motor adaptor plate 32 for coaction with the latching mechanisms 40 which secure the motor subassembly to the main housing. The four above mentioned latching mechanisms 40 are identical in structure; and the latching mechanism shown on the right in FIG. 1 will be described in detail with reference to FIGS. 2 through 7.

The latching mechanism 40 consists broadly of a linear tension spring latching member 41 coupled selectively between a latching pin and an oscillating control lever 42. The oscillating lever controls the engaging and disengaging of the spring latching member with the latching pin and also controls the tensioning of the spring in the locked position.

Figure 2:
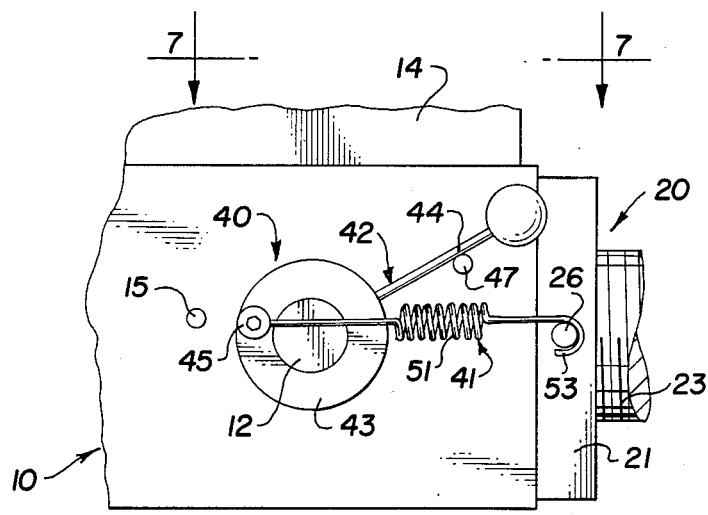
FIG. 2 is a fragmentary side elevation showing the locked condition of one latching mechanism, as also illustrated in FIG. 1.
Figure 3:
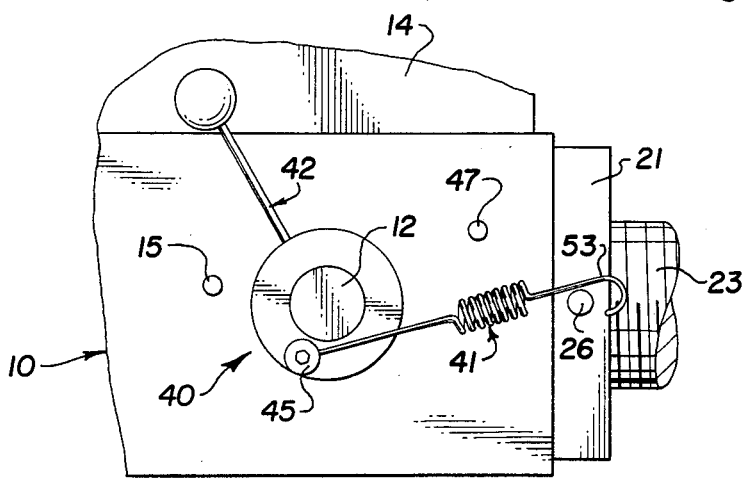
FIGS. 3 through 6 are fragmentary side elevations similar to FIG. 2, illustrating different positions of the latching mechanism illustrated in FIG. 2.

FIG. 2 illustrates the locked condition of the latching mechanism, which is the condition also illustrated in FIG. 1. The control lever 42 consists of a ring or wheel 43, a radial arm 44 fixed to the ring 43 and carrying a knob at its distal end, and a journal bolt 45 mounted on the ring 43 eccentrically of the axis of rotation of the ring. The ring 43 is rotatably mounted on the main housing 10 by means of a journal bolt 12 which is locked to the housing to allow free rotation of the control lever. However, the rotation of the control lever 42 is desirably restrained frictionally by means of a friction member such as a friction washer 13 interposed between the main housing 10 and the ring 43. This friction member 13 will allow desired oscillation of the lever 42 while retaining the lever in a selected rotational position.

Figure 8:
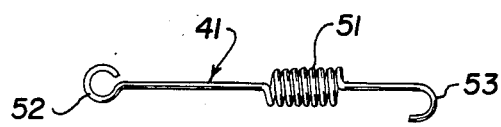
FIG. 8 is a side view of a latch spring illustrated in the other figures.

The linear tension spring 41, as best seen in FIG. 8, includes a tension coil 51 intermediate its ends, an eye 52 at one end separated from the coil by a shank, and a reentrant hook 53 at the other end also separated from the coil by a shank. As seen in the figures, the eye of the latching spring 41 is journaled about the journal bolt 45 of the ring 43; and the spring is frictionally mounted on the ring by means of a spring washer 46 or other friction member, so that rotation or oscillation of the spring 41 relative to the lever 42 is frictionally restrained.

The lock position of the latching mechanism 40, illustrated in FIG. 2, is defined by a stop pin 47 mounted on the main body 10, which limits rotation of the lever 42 (in a clockwise direction in FIG. 2) and by the location of the spring journal bolt 45 relative to the axis of the lever when the lever is against the stop pin 45. It will be seen in FIG. 2 that the line of tensile force of the latching spring 41, between the latching pin 26 and the journal bolt 45, lies above the axis of rotation of the lever 42, thereby providing an over center force to urge rotation of the lever in a clockwise direction and maintain the lever against the stop pin 47.

Figure 5:
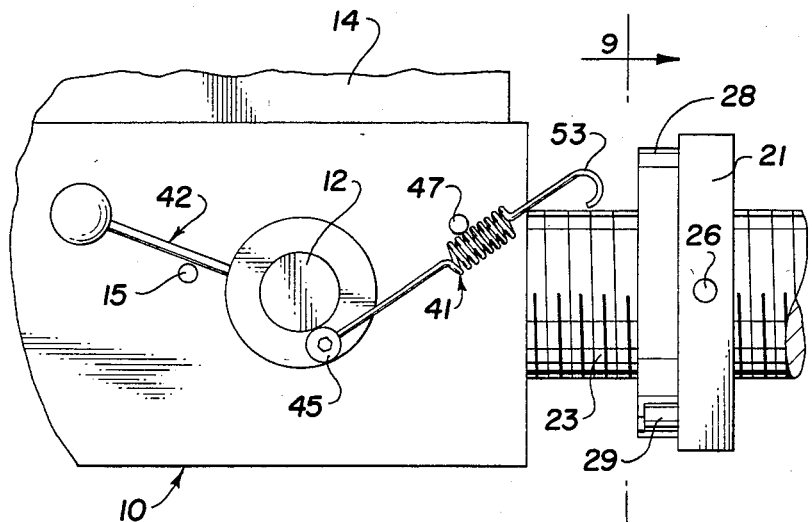
Figure 9:
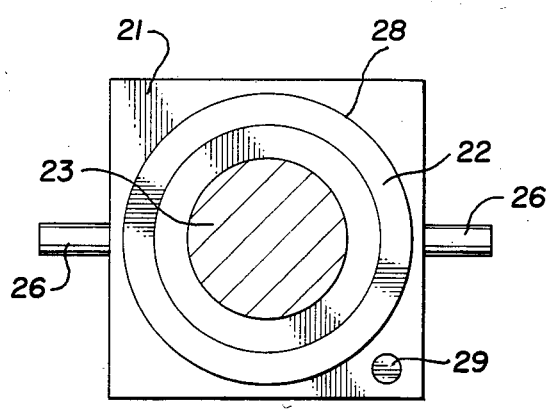
FIG. 9 is a partially sectional view taken along the line 9—9 of FIG. 5.

The lead nut plate 21 is positioned relative to the main housing 10 by means other than the latching mechanism of the invention. As best seen in FIGS. 5 and 9, the lead nut plate includes a boss at its inner face defining a cylindrical shoulder 28 which is received within a complementary cylindrical recess in the end of the main housing 10 to center the spindle assembly relative to the main housing. Also, a dowel 29 projects inwardly from the lead nut plate and is received within a coacting bore in the main housing end face to prevent rotation of the lead nut plate relative to the housing. In this described application, there is limited axial force tending to separate the lead nut plate axially from the main housing. During the tapping of a right hand thread, the axial load of the apparatus is such as to urge the lead nut plate toward the housing, at least at the beginning of the tapping operation. When spindle operation is reversed to withdraw the tap from the workpiece, there is very limited axial load tending to move the lead nut plate away from the housing, since the tap must then follow the threads just cut into the workpiece.

Figure 4:
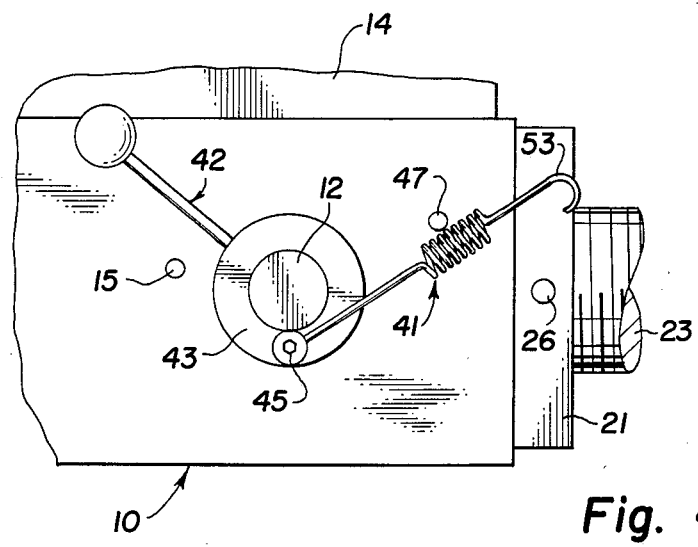

To effect the release of the lead screw assembly from the main housing, and to allow withdrawal of the assembly from the housing, the levers 42 of the two latching mechanisms are rotated approximately 130° for example from the lock position illustrated in FIG. 2. For the latching mechanism illustrated in FIGS. 2 through 5 this rotation through 130° will be a continuous and smooth counterclockwise rotation; however this rotation is illustrated in stages in FIGS. 3, 4 and 5 to identify the several functions which accompany this rotation. During the first phase of the rotation illustrated in FIG. 3, about 90° from the limit position for example, the spring 41 is moved to the right to disengage the hook 53 from the pin 26. The spring, of course, is trying to rotate counterclockwise; and as soon as the tip of the hook clears the pin, the spring will move counterclockwise with the lever 42. This phase of movement is illustrated in FIG. 4 wherein, with additional rotation of the lever 42, the spring 41 will move counterclockwise until it engages the stop pin 47 and further rotation is prevented. With further rotation of the lever 42 illustrated in FIG. 5, the accompanying movement of the journal bolt 45 will effect additional primarily linear movement of the spring to the right. The purpose of this movement is to assure that when the spring is again moved into engagement with a latch pin, as will be described, the tip of the hook 53 will not interfere with the latch pin and will allow the adjacent shank to engage the latch pin to permit subsequent latching engagement of the hook and pin. Since no further rotation of the lever 42 is desired, a stop pin 15 is provided on the main housing to prevent over-rotation of the lever. Of course, the lever 42 on the opposite side of the main housing 10 must be manipulated in the same manner.

Because of the friction washers 13, the levers 42 will hold the FIG. 5 positions, allowing the spindle assembly 20 to be removed from the main housing without interference from the latching springs 41. For this removal of the spindle assembly, the cover 11 must also be removed to allow disengagement of some control levers from the spindle within the main housing. The cover 11 is preferably mounted to be quickly removed and reattached to the main housing.

Figure 6:
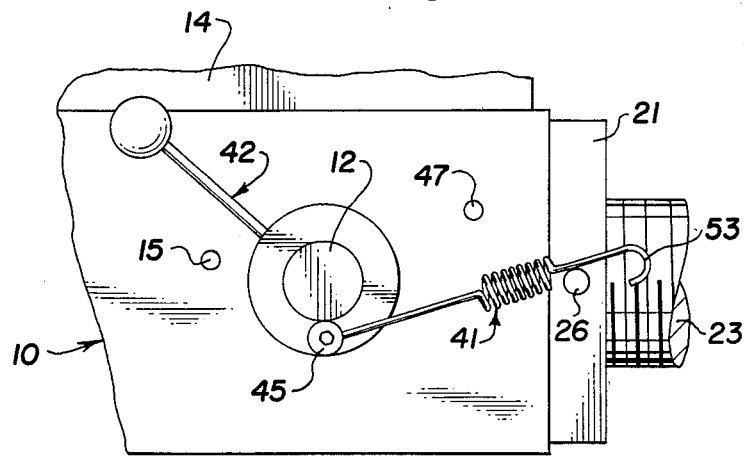
Figure 7:
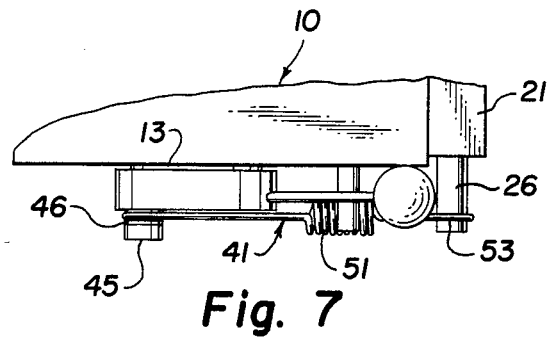
FIG. 7 is a fragmentary top view of the latching mechanism taken along the line 7—7 of FIG. 2.

After a new spindle assembly 20 is placed in the joined position with the main housing, the latching of the spindle assembly is accomplished again by a smooth continuous rotation of the levers 42 between the FIG. 5 position through the FIG. 6 position to the FIG. 2 position. During the first phase of this movement illustrated in FIG. 6, the spring 41 is swung along with the lever 42 to position the spring shank adjacent to the hook 53 in engagement with the latching pin 26. During the second phase of this movement, the spring is moved to the left to engage the hook 53 with the latching pin 26, to tension the spring, and to move the spring to the over center locking position illustrated in FIG. 2.

The motor adaptor plate 32 will be provided with a centering shoulder and an anti-rotational dowel similar to that described for the lead nut plate; and the motor assembly 30 is released from the main housing and reassembled with the main housing in the same manner through its associated latching mechanisms 40. Latching mechanisms as described are suitable for latching the motor subassembly to the main housing since there are no axial forces tending to separate the subassembly from the housing.

The coil 51 of the spring latching member 41 is quite stiff and inflexible, so that the member will function as a stiff arm to assure disengagement of the hook 53 from the latching pin 26. The coil preferably provides a relatively strong tensile force, such as 30 pounds for example, so that the respective subassemblies are held very tightly to the main housing when the spring is tensioned. A spring member of this type is extremely effective, since it serves the function of a rigid arm and also assures the very tight retention of the secured components even after substantial wear of the journal bolts 12 and 45 and the latching pin 26. It enables reduced manufacturing costs, since the need for very close tolerances with respect to the journal bolts 12 and 45 and with respect to the latching pins 26 is eliminated.

METHOD

A method for latching or securing first and second components together and for unlatching those components, as practices by the above described mechanism, includes the following steps:

Mounting a lever on the first component for oscillation about a fixed axis;

mounting the proximal end of a linear tension spring latching member on that lever, for frictionally retarded rotation about an axis which is eccentric to and parallel to the oscillation axis of the lever;

providing a latching pin on the second component, which latching pin is disposed generally parallel with the lever oscillation axis and with the eccentric axis of the latching member, when the second component is in the joined condition or relation with the first component;

mounting that linear latching member in a manner to extend generally transverse to that oscillation axis and to the latching pin;

providing the latching member with a latching hook at its distal end for hooking engagement with the latching pin;

moving the lever in a first direction to a stop limit relative to the first component, which stop limit defines a lock position of the lever wherein the spring latching member is tensioned to latch the second component, and wherein the tension of the spring latching member is applied along a line between the lever oscillation axis and the stop limit whereby the tension of the spring latching member maintains the lever in that lock position at the stop limit;

moving the lever in a second opposite direction away from said stop limit to release the tension of the spring latching member, to shift the latching member generally longitudinally to displace the hook from the latching pin, and to swing the latching member away from the latching pin to allow withdrawal of the second component carrying the latching pin;

limiting the swinging of the latching member away from the latching pin during continued movement of the lever in that second direction, to maintain the latching member in a position to reengage a latching pin of a second component again placed in joined relation or condition with the first component;

moving the lever further in that second direction, after limiting the rotation of the latching member, to effect the longitudinal or linear shifting of that latching member to further displace or move the latching member hook from the position of the latching pin;

frictionally retarding the oscillation of the lever relative to the first component, whereby the lever will maintain a selected oscillatory position, such as the position where the latching member is maintained against the stop limit to allow for removal of and replacement of a second component without interference from the latching member; and moving said lever in the first direction, from a position remote from the stop limit, to swing the latching member into engagement with the latching pin of a second component is joined relation with the first component, to displace the latching member longitudinally toward the oscillation axis to effect the engagement of the hook with the latching pin, and to then move the eccentric axis of the latching member past the plane defined by the oscillation axis and the latching pin to place the latching spring in the lock condition.

What has been described is a novel and unique mechanism and method for latching one component to another and for unlatching those components, or more particularly for latching a subassembly to a main assembly and allowing quick unlatching and relatching to effect a quick change of subassemblies.

A principal feature and advantage of the invention is that, through a simple continuous movement or oscillation of a lever through an arc of 130° for example, a latching member is released from a latching pin and moved out of the way of the latching pin to allow removal of the existing subassembly and replacement of a new subassembly without interference from the latching mechanism. In the described embodiment, two such latching mechanisms are utilized for each replaceable subassembly. In another type of assembly, the subassembly or member to be latched or unlatched may be a swinging member permanently hingedly attached at one side and latched by means of a mechanism of the invention on the other side. In another type of mechanism, the member or subassembly to be released and reattached may include a releasable hinge on one side and a single latching mechanism according to the invention on the other side thereby allowing complete detachment of and replacement of the subassembly with only one latching mechanism according to the invention.

An ancillary feature of the invention is that when the latching mechanism is rotated or oscillated to one position, it will hold or maintain that position, to minimize interference with the removal and replacement of the joined component from and to the joined condition or position.

Another important feature and advantage of the invention is that, with a second simple continuous oscillation or movement of the control lever in the other direction, the tension spring latching member is repositioned for engagement with the latching pin, is moved into latching engagement with the latching pin, and the lever is moved to the lock position wherein the tension placed on the latching member maintains that lever in the lock position.

As a result of this invention, the changing or replacement of a component or subassembly may be accomplished in about two minutes, for example, where that operation might require as long as twenty minutes where conventional techniques are used for securing the subassembly or component.

While the preferred embodiments of the invention have been illustrated and described, it will be understood by those skilled in the art that changes and modifications may be resorted to without departing from the spirit and scope of the invention.

What is claimed is:

1. A mechanism for securing a second component to a first component comprising a lever mounted on said first component for oscillation about a fixed axis;

a latching pin mounted on said second component disposed, in the joined condition of said first and second components, generally parallel with the oscillation axis of said lever and generally traversing the plane of oscillation of said lever;

said lever including a pivot mount for a latching member; said pivot mount being disposed eccentrically of said oscillation axis and having a pivot axis parallel thereto;

a linear tension spring latching member having a pivot mount at one end, and having a hook at its other end configured for engagement with said latching pin;

said pivot mount of said latching member being frictionally mounted on said pivot mount of said lever, whereby said latching member will normally oscillate with said lever;

lever stop means on said first component for limiting movement of said lever in one direction, defining a lock position of said lever wherein the tension of said spring latching member maintains said lever against said stop means;

latching member stop means on said first component for limiting oscillation of said latching member away from said latch pin, when said lever is moved in the other direction away from said lever stop means.

2. A mechanism as set forth in claim 1 including said pivot mount of said lever and said latching pin, in the joined condition of said first and second components and in the latch position of said lever, being disposed in a common plane which lies between said oscillation axis and said stop means limiting movement of said oscillation lever; whereby said tension spring latching member maintains said lever against said stop means.

3. A mechanism as set forth in claim 1 including said movement of said lever away from said stop means effecting movement of said lever pivot mount first away from said latch pin, and then toward said latch pin to effect release of said latching member hook from said latching pin.

4. A mechanism as set forth in claim 3 including said movement of said lever away from said stop means effecting swinging of said latching member away from said latching pin toward said latching member stop means after release of said latching member hook from said latching pin.

5. A mechanism as set forth in claim 1 including said movement of said lever away from said lever stop means, after engagement of said latching member with said latching member stop means, effecting movement of said pivot mounts toward the joined position of said latching pin with resultant generally longitudinal movement of said latching member relative to said latching pin position.

6. A mechanism as set forth in claim 1 including said movement of said lever in said one direction, from a position remote from said lever stop means, effecting first swinging of said latching member into engagement with said latching pin, and then generally longitudinal movement of said latching member relative to said latching pin to engage said hook with said latching pin.

7. A mechanism as set forth in claim 1 including said lever being mounted on said first component for frictionally restricted oscillation, whereby said lever will maintain a selected oscillatory position relative to said first component.

8. A mechanism as set forth in claim 1 including said tension spring latching member including a relatively inflexible spring coil whereby said member functions as a relatively rigid, but elastic latching arm.

9. A mechanism as set forth in claim 8 including said latching member comprising a reentrant hook spaced from said spring coil by a linear shank.

10. A method for latching and unlatching components in a joined condition, comprising the steps mounting a lever on a first component for oscillation about a fixed axis;

mounting a proximal end of a linear tension spring latching member on said lever, for frictionally retarded rotation about an axis eccentric to and parallel to said oscillation axis;

providing a latching pin on a second component disposed, in the joined condition of said first and second components, generally parallel with said oscillation axis and said eccentric axis;

providing said latching member with a latching hook at its distal end for engagement with said latching pin;

moving said lever in a first direction to a stop limit, relative to said first component, to define a lock position of said lever wherein said spring latching member is tensioned to latch said second component, and wherein the tension of said spring latching member maintains said lever in said lock position;

moving said lever in a second direction to release the tension of said spring latching member, to shift said latching member longitudinally to displace said hook from said latching pin, and to swing said latching member away from said latching pin;

limiting the swinging of said latching member away from said latching pin, during movement of said lever in said second direction, to maintain said latching member in a position to reengage said latching pin of a second component in the joined condition with said first component.

11. A method as set forth in claim 10 including moving said lever further in said second direction, after limiting said swinging of said latching member, to shift said latching member longitudinally to further displace said hook.

12. A method as set forth in claim 10 including moving said lever in said first direction to swing said latching member into engagement with said latching pin, and to displace said latching member longitudinally to engage said hook with said latching pin, prior to movement of said lever to said lock position.

13. A method as set forth in claim 10 including frictionally retarding the oscillation of said lever relative to said first component, whereby said lever will maintain a selected oscillatory position.

14. A method as set forth in claim 10 including providing said tension spring latching member with a relative inflexible spring coil whereby said member functions as a relatively rigid, but elastic latching arm.

* * * * *